United States Patent
Cui et al.

(10) Patent No.: US 12,143,255 B2
(45) Date of Patent: Nov. 12, 2024

(54) SUBCARRIER SPACING RESTRICTION FOR SSB, CSI-RS FOR L3 MOBILITY, AND PDCCH/PDSCH

(71) Applicant: APPLE INC., Cupertino, CA (US)

(72) Inventors: Jie Cui, Cupertino, CA (US); Yushu Zhang, Beijing (CN); Chunxuan Ye, San Diego, CA (US); Dawei Zhang, Cupertino, CA (US); Haitong Sun, Cupertino, CA (US); Hong He, Cupertino, CA (US); Manasa Raghavan, Cupertino, CA (US); Oghenekome Oteri, San Diego, CA (US); Weidong Yang, San Diego, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 520 days.

(21) Appl. No.: 17/593,709

(22) PCT Filed: Apr. 14, 2021

(86) PCT No.: PCT/CN2021/087318
§ 371 (c)(1),
(2) Date: Sep. 23, 2021

(87) PCT Pub. No.: WO2022/021944
PCT Pub. Date: Feb. 3, 2022

(65) Prior Publication Data
US 2022/0353126 A1    Nov. 3, 2022

(30) Foreign Application Priority Data

Jul. 29, 2020    (WO) ................. PCT/CN2020/105509

(51) Int. Cl.
*H04L 27/26* (2006.01)
*H04W 72/23* (2023.01)
(Continued)

(52) U.S. Cl.
CPC ....... *H04L 27/26025* (2021.01); *H04W 72/23* (2023.01); *H04W 72/542* (2023.01); *H04W 56/001* (2013.01)

(58) Field of Classification Search
CPC .......... H04L 27/26025; H04W 72/542; H04W 72/23; H04W 56/001
See application file for complete search history.

(56) References Cited

U.S. PATENT DOCUMENTS 10,484,890 B2 *  11/2019  Lin ...................... H04W 24/02
11,375,527 B1 *   6/2022  Eyuboglu .......... H04B 7/15528
(Continued)

FOREIGN PATENT DOCUMENTS

| WO | 2019215901 A1 | 11/2019 |
| WO | 2019245199 A1 | 12/2019 |
| WO | 2020041366 A1 | 2/2020 |

OTHER PUBLICATIONS

PCT/CN2021/087318, International Search Report and Written Opinion, Jul. 15, 2021, 9 pages.
(Continued)

*Primary Examiner* — Jael M Ulysse
(74) *Attorney, Agent, or Firm* — Dorsey & Whitney LLP

(57) ABSTRACT

Technology is provided for supporting different numerologies for concurrent intra-frequency measurements and downlink data reception. A user equipment (UE) may send a message to the a wireless network to indicate whether the UE supports a mixed numerology wherein a different subcarrier spacing (SCS) is used in a serving cell or a neighboring cell for concurrent processing of at least two of: intra-frequency measurement by the UE of a synchronization signal block (SSB); intra-frequency measurement by the UE of a channel state information reference signal (CSI-RS) for mobility; and reception by the UE of a physical downlink control channel (PDCCH) or a physical downlink shared
(Continued)

channel (PDSCH). Based on the indication, the network may configure at least one of a CSI-RS measurement expectation, an SSB measurement expectation, and a scheduling restriction for reception of the PDCCH or the PDSCH by the UE.

20 Claims, 6 Drawing Sheets

(51) Int. Cl.
*H04W 72/542* (2023.01)
*H04W 56/00* (2009.01)

(56) References Cited

U.S. PATENT DOCUMENTS

| | | | | |
|---|---|---|---|---|
| 11,706,736 | B2* | 7/2023 | Rune | H04W 76/28 370/329 |
| 2019/0393980 | A1 | 12/2019 | Lin et al. | |
| 2020/0280942 | A1* | 9/2020 | Jung | H04J 11/0069 |
| 2021/0028852 | A1* | 1/2021 | Hwang | H04B 17/327 |
| 2021/0083730 | A1* | 3/2021 | Hwang | H04L 5/0092 |
| 2021/0092697 | A1* | 3/2021 | Harada | H04L 27/26025 |
| 2021/0184824 | A1* | 6/2021 | Kwak | H04L 5/0094 |
| 2021/0195452 | A1* | 6/2021 | Harada | H04L 5/0053 |
| 2021/0227418 | A1* | 7/2021 | Hwang | H04W 72/0446 |
| 2021/0266898 | A1* | 8/2021 | Cha | H04W 24/10 |
| 2021/0297884 | A1* | 9/2021 | Harada | H04J 11/0083 |
| 2021/0320833 | A1* | 10/2021 | Kim | H04W 48/10 |
| 2022/0110109 | A1* | 4/2022 | Tsai | H04W 72/27 |
| 2022/0240326 | A1* | 7/2022 | Rune | H04W 56/001 |
| 2023/0070204 | A1* | 3/2023 | Kim | H04W 48/10 |
| 2023/0208490 | A1* | 6/2023 | Kim | H04B 7/0626 370/329 |
| 2023/0318687 | A1* | 10/2023 | Kim | H04L 5/00 370/329 |

OTHER PUBLICATIONS

CMCC, "CR on introducing inter-frequency measurements without measurement gap (9.1.5, 9.1.6, 9.3.1, 9.3.4, 9.3.5)", R4-2008996, 3GPP TSG-RAN WG4 Meeting # 95-e, Electronic Meeting, Change Request 38.133 CR 0690 Rev 1 Current Version 16.3.0, May 25-Jun. 5, 2020, 17 pages.

Huawei, Hisilicon, et al., "Add 30KHz SGS for n40 SSB", R4-2000193, 3GPP TSG-RAN WG4 Meeting #94e Online, Agenda Item 6.3.2, Feb. 24-Mar. 6, 2020, 8 pages.

Intel Corporation, "NR RRM enhancement in R16", RP-201111, 3GPP TSG RAN meeting #88e, Electronic Meeting, Agenda Item 9.3.24, Jun. 29-Jul. 3, 2020, 28 pages.

NTT Docomo, Inc., "Remaining issues on measurement for mobility management", R1-1800655, 3GPP TSG RAN WG1 Meeting AH 1801, Vancouver, Canada, Agenda Item 7.1.5.1, Jan. 22-26, 2018, 8 pages.

* cited by examiner

SUBCARRIER SPACING RESTRICTION FOR SSB, CSI-RS FOR L3 MOBILITY, AND PDCCH/PDSCH

TECHNICAL FIELD

This application relates generally to wireless communication systems, including systems supporting different numerologies for concurrent intra-frequency measurements and downlink data reception.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
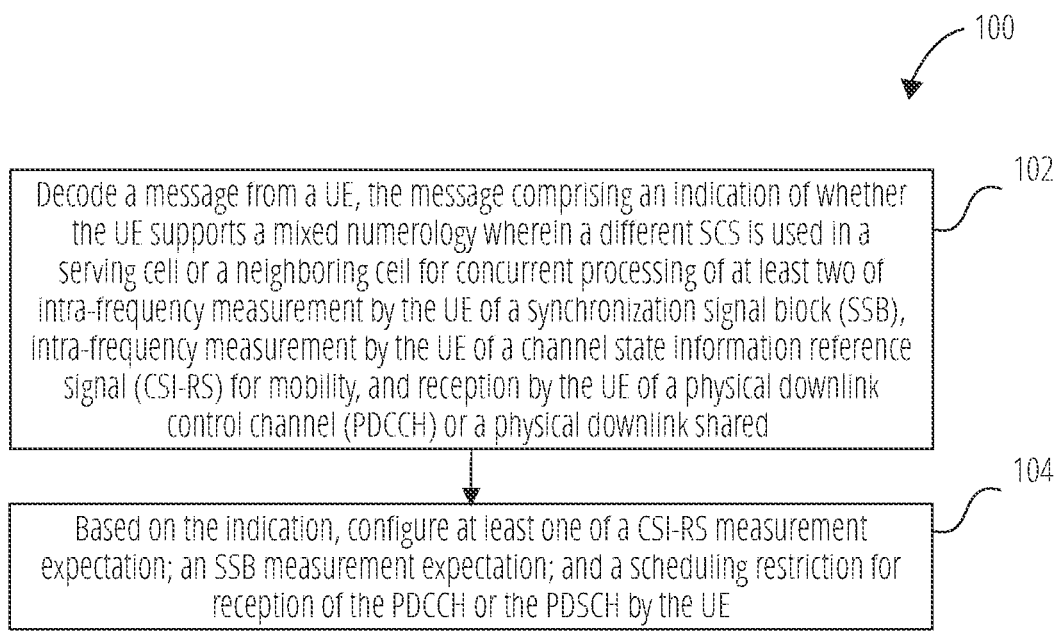
FIG. 1 illustrates a method for a wireless network in accordance with one embodiment.

In wireless networks, downlink (DL) based radio resource management (RRM) measurements at a UE in a connected mode may be used for layer 3 (L3) mobility. L3 mobility may allow a UE to roam through different networks without losing its internet protocol (IP) address and sessions. A reference signal received power (RSRP) of a synchronization signal (SS) block (SSB) or a channel state information reference signal (CSI-RS) measured by the UE in a connected mode may be used for L3 mobility.

In general, a base station may broadcast SSB signals that include synchronization and cell-specific information for accessing a cell associated with the base station. The SSB may include a primary synchronization signal (PSS), a secondary synchronization signal (SSS), and a physical broadcast channel (PBCH). Thus, SSB may also be referred to as a synchronization signal/PBCH block. The PSS and SSS may include synchronization signaling as well as information for decoding the PBCH, such as a cell identifier (ID). The PBCH may indicate transmission parameters that may be used for initial cell access, including the downlink system bandwidth, physical hybrid automatic repeat request (HARQ) channel structure, system frame number, and/or antenna ports used by the cell. After decoding the PBCH, the UE may monitor downlink for CSI-RSs in accordance with resource locations associated with antenna-ports identified by the CSI-RS configuration for either the serving cell and/or one or more neighboring cells (e.g., for L3 mobility purposes). Upon detecting the CSI-RSs, the UE may generate channel quality information (CQI), which is then fed-back to the base station and used to select transmission parameters during link establishment.

In certain systems, a measurement object of a CSI-RS for mobility can be configured with a specific subcarrier spacing (SCS) on each frequency layer. For example, a measurement object configuration information element (IE) may include:

```
MeasObjectNR ::=          SEQUENCE {
    refFreqCSI-RS             ARFCN-ValueNR         (frequency info)
    referenceSignalConfig     Reference SignalConfig, (signal configuration)
}
ReferenceSignalConfig::=  SEQUENCE {
    ssb-ConfigMobility        SSB-ConfigMobility    OPTIONAL,  -- Need M b
```

```
  csi-rs-ResourceConfigMobility   SetupRelease { CSI-RS-ResourceConfigMobility }
    OPTIONAL   -- Need M (L3 CSI-RS configuration with same freq)
}
CSI-RS-ResourceConfigMobility ::= SEQUENCE {
  subcarrierSpacing           SubcarrierSpacing,
  csi-RS-CellList-Mobility      SEQUENCE (SIZE (1..maxNrofCSI-RS-CellsRRM)) OF
    CSI-RS-CellMobility,   -- maxNrofCSI-RS-CellsRRM =96
    refServCellIndex          ServCellIndex         OPTIONAL   -- Need S
}
```

On a same frequency, a control or data channel (e.g., physical downlink control channel (PDCCH) or physical downlink shared channel (PDSCH)) and an SSB may have different SCS from that of the CSI-RS for mobility. However, the PDCCH or PDSCH could have a different SCS from the SSB as well. Thus, for example, there may be three different numerologies (e.g., 15 kHz SCS, 30 kHz SCS, and 60 kHz SCS for FR1) on one frequency for PDCCH/PDSCH, SSB, and CSI-RS for mobility. As used herein, a numerology refers to a particular SCS value (e.g., 15 kHz). However, persons skilled in the art will recognize from the disclosure herein that a numerology may associate the particular SCS value with one or more other parameters, such as a cyclic prefix (CP) length of orthogonal frequency division multiplexing (OFDM) symbols.

While some wireless systems may use a mixed numerology for SSB and PDCCH/PDSCH, certain UEs may not have sufficient processing, memory, and/or power resources to handle using three different SCSs on one frequency to coordinate the measurement resources or demodulation resources among PDCCH/PDSCH, SSB and CSI-RS for mobility. The UE may have increased difficult, for example, for measurement without measurement gap (MG) cases. If MG is configured for measurement, PDCCH/PDSCH may naturally get muted. Thus, certain embodiments disclosed herein provide a restriction of SCS in intra-frequency CSI-RS mobility measurement as well as a measurement and/or scheduling restriction.

In certain wireless systems, when CSI-RS resource of serving cell is available, CSI-RS based intra-frequency measurement comprises a measurement is defined as a CSI-RS based intra-frequency measurement provided that: the SCS of CSI-RS resources on the neighbor cell configured for measurement is the same as SCS of CSI-RS resource on the serving cell indicated for measurement, and the CP type of CSI-RS resources on neighbor cell configured for measurement is the same as the CP type of CSI-RS resources on the serving cell indicated for measurement, and it is applied for a predetermined SCS (e.g., 60 kHz), and wherein the center frequency of CSI-RS resources on the neighbor cell configured for measurement is the same as center frequency of CSI-RS resource on the serving cell indicated for measurement. Otherwise. CSI-RS based inter-frequency measurement may be a measurement that is defined as a CSI-RS based inter-frequency measurement if it is not a CSI-RS based intra-frequency measurement. Generally, the UE may use a gap to perform an inter-frequency measurement. Thus, a UE performing inter-frequency measurements may not experience the same difficulties as when the UE performs intra-frequency measurements with mixed numerologies on the same frequency or component carrier (CC).

In certain embodiments, to avoid increased cost and complexity of the UE, SCS is restricted for SSB. L3 CSI-RS, and PDCCH/PDSCH. Thus, while the network is able to use three different SCSs for SSB, L3 CSI-RS, and PDCCH/PDSCH, the SCS restriction allows only up to two SCSs for one serving cell to be configured. Thus, two of the three operations for SSB based measurement, L3 CSI-RS based measurement, and PDCCH/PDSCH reception share a first SCS and the remaining operation uses a second SCS. For example, an SCS restriction in one embodiment may indicate that SSB and CSI-RS for mobility share the same SCS for the same serving cell. In another example, the SCS restriction may indicate that PDCCH/PDSCH and CSI-RS for mobility share the same SCS for the same serving cell. The SCS restriction may be defined in the standard so the UE and the network use the same SCS assumptions and options. In other embodiments, the SCS restriction may be configured on a network, serving cell, or component carrier (CC) basis.

Even when the SCS restriction allows only up to two SCS for a serving cell, some UEs may not support mixed numerology (different SCS) on the same frequency. Thus, the UE may send a message to the network to indicate a UE capability of supporting mixed numerology. In certain embodiments, a UE capability parameter in a radio resource control (RRC) message may be modified to indicate support for CSI-RS for mobility in a mixed numerology.

For example, the simultaneousRxDataSSB-DiffNumerology parameter in a set of UE capability parameters defined in 3GPP TS 38.306 indicates whether the UE supports concurrent intra-frequency measurement on serving cell or neighboring cell and PDCCH or PDSCH reception from the serving cell with a different numerology. In an embodiment where the SSB and CSI-RS for mobility share the same SCS for the same serving cell, the simultaneousRxDataSSB-DiffNumerology parameter may be updated to indicate whether the UE supports concurrent intra-frequency measurement on SSB or CSI-RS for mobility on serving cell or neighboring cell and PDCCH or PDSCH reception from the serving cell with a different numerology. In another embodiment where PDCCH/PDSCH and CSI-RS for mobility share the same SCS for the same serving cell, the simultaneousRxDataSSB-DiffNumerology parameter may be configured to indicate whether the UE supports concurrent intra-frequency measurement on serving cell or neighboring cell and PDCCH or PDSCH reception or CSI-RS measurement for mobility from the serving cell with a different numerology.

The network may respond to the indication of UE capability by configuring a CSI-RS measurement expectation, an SSB measurement expectation, or a scheduling restriction for PDCCH or PDSCH reception by the UE.

In one embodiment, for example, a serving cell is configured for the SSB and CSI-RS for mobility to share a first SCS and PDCCH/PDSCH to use a second SCS. The UE may send a UE capability message including the simultaneousRxDataSSB-DiffNumerology parameter to indicate whether the UE supports concurrent intra-frequency measurement on SSB or CSI-RS for mobility on serving cell or neighboring cell and PDCCH or PDSCH reception from the serving cell with a different numerology. If the UE capability message indicates that the mixed numerology is supported, the network schedules the UE to receive PDCCH and/or PDSCH on symbols where the UE may also measure SSB or CSI-RS. If the UE capability message indicates that the mixed numerology is not supported, however, the network does not schedule the UE for PDCCH and/or PDSCH reception on a group of symbols where the UE measures SSB or CSI-RS and one symbol before SSB or CSI-RS and one symbol after SSB or CSI-RS. The one symbol before and one symbol after the SSB or CSI-RS provides a margin for the time misalignment between the serving cell and the UE.

In another example embodiment, a serving cell is configured for the PDCCH/PDSCH and CSI-RS for mobility to share a first SCS and the SSB to use a second SCS. The UE may send a UE capability message including the simultaneousRxDataSSB-DiffNumerology parameter to indicate whether the UE supports concurrent intra-frequency measurement on serving cell or neighboring cell and PDCCH or PDSCH reception or CSI-RS measurement for mobility from the serving cell with a different numerology. If the UE capability message indicates that the mixed numerology is supported, the network may expect the UE to perform CSI-RS measurements and SSB measurements on the same symbols. If the UE capability message indicates that the mixed numerology is not supported, however, the network does not expect the UE to perform CSI-RS measurements and SSB measurements on the same symbols. For example, when the UE cannot support mixed numerology, the network may determine to: not expect the UE to perform CSI-RS measurement on a group of symbols where the UE is measuring SSB and one symbol before SSB and one symbol after SSB; not expect the UE to perform SSB measurement on a group of symbols where the UE is measuring CSI-RS and one symbol before CSI-RS and one symbol after CSI-RS; or use a scaling factor for time resource allocation for CSI-RS based mobility measurement and SSB based mobility measurement (e.g., 50% time occasion for CSI-RS based mobility measurement and 50% time occasion for SSB based mobility measurement when they collide with each other on time domain). The one symbol before and one symbol after provides a margin for the time misalignment between the serving cell and the UE.

In another embodiment, the UE may indicate its capability of the number of mixed numerologies, and the network configures CSI-RS or PDCCH/PDSCH based on this capability.

For example, in one embodiment, the UE sends a UE capability message including a simultaneousCSIRSandSSB-DiffNumerology parameter to indicate whether the UE supports concurrent intra-frequency measurement on serving cell or neighboring cell for both SSB and CSI-RS for mobility with a different numerology. If the UE indicates that it cannot support simultaneousCSIRSandSSB-DiffNumerology, after receiving the UE capability, the network may selectively determine to: not expect the UE to perform CSI-RS measurement on a group of symbols where the UE is measuring SSB and one symbol before SSB and one symbol after SSB; not to expect UE to perform SSB measurement on a group of symbols where the UE is measuring CSI-RS and one symbol before CSI-RS and one symbol after CSI-RS; or use a scaling factor for time resource allocation for CSI-RS based mobility measurement and SSB based mobility measurement (e.g., 50% time occasion for CSI-RS based mobility measurement and 50% time occasion for SSB based mobility measurement when they collide with each other on time domain). Again, the one symbol before and one symbol after provides a margin for the time misalignment between the serving cell and the UE.

As another example embodiment, the UE sends a UE capability message including a simultaneousRxDataCSIRS-DiffNumerology parameter to indicate whether the UE supports concurrent intra-frequency measurement on serving cell or neighboring cell on CSI-RS for mobility and PDCCH or PDSCH reception from the serving cell with a different numerology. If the UE indicates that it cannot support simultaneousRxDataCSIRS-DiffNumerology, after receiving the UE capability, the network may determine to not schedule the UE for PDCCH/PDSCH reception on a group of symbols where the UE is measuring CSI-RS and one symbol before CSI-RS and one symbol after CSI-RS. The one symbol before and one symbol after provides a margin for the time misalignment between the serving cell and the UE.

As another example embodiment, the UE sends a UE capability message including a simultaneousRxDataCSIR-SandSSB-DiffNumerology parameter to indicate whether the UE supports concurrent intra-frequency measurement on serving cell or neighboring cell on SSB with a first SCS (SCS 1), CSI-RS for mobility with a second SCS (SCS 2), and PDCCH or PDSCH reception from the serving cell with a third SCS (SCS 3), where SCS 1, SCS 2, and SCS 3 are three different SCSs. In FR1, for example, SCS 1 is selected from 15 kHz or 30 kHz and SCS2 and SCS3 are selected from 30 kHz or 60 kHz. In FR2, for example, SCS 1 is selected from 120 kHz or 240 kHz and SCS 2 and SCS 3 are selected from 60 kHz and 12o kHz. If the UE indicates that it cannot support simultaneousRxDataCSIRSandSSB-DiffNumerology, after receiving the UE capability, the network may determine to not expect the UE to receive data and measure CSI-RS for mobility and measure SSB when they are colliding on the time domain and they are using the different SCSs.

FIG. 1 is a flowchart illustrating a method 100 for a wireless network, according to certain embodiments. In block 102, the method 100 includes decoding a message from a UE. The message includes an indication of whether the UE supports a mixed numerology wherein a different SCS is used in a serving cell or a neighboring cell for concurrent processing of at least two of intra-frequency measurement by the UE of SSB, intra-frequency measurement by the UE of CSI-RS for mobility, and reception by the UE of PDCCH or PDSCH. In block 104, based on the indication, method 100 further includes configuring at least one of a CSI-RS measurement expectation, an SSB measurement expectation, and a scheduling restriction for reception of the PDCCH or the PDSCH by the UE.

In certain embodiments, the method 100 further includes configuring up to two SCS for the serving cell, wherein the SSB and the CSI-RS for mobility share a first SCS of the two SCS for the serving cell. The indication indicates whether the UE supports concurrent reception of the PDCCH or the PDSCH by the UE from the serving cell using the first SCS, and intra-frequency measurements by the UE of the SSB or the CSI-RS for mobility using a second SCS of the two SCS. The indication may include, for example, a simultaneousRxDataSSB-DiffNumerology parameter in a set of UE capability parameters. The method 100 may further include, in response to the indication indicating that the UE does not support the mixed numerology, configuring the scheduling restriction to not schedule the UE for reception of the PDCCH or the PDSCH on: a group of one or more symbols where the UE is configured to measure the SSB or the CSI-RS; a first symbol before the group of one or more symbols: and a second symbol after the group of one or more symbols.

In certain embodiments, the method 100 further includes configuring up to two SCS for the serving cell, wherein the CSI-RS for mobility and reception of the PDCCH or the PDSCH by the UE share a first SCS of the two SCS for the serving cell. The indication indicates whether the UE supports concurrent: reception of the PDCCH or the PDSCH by the UE from the serving cell, or intra-frequency measurements by the UE of the CSI-RS for mobility, using the first SCS of the two SCS, and intra-frequency measurements by the UE of the SSB using a second SCS of the two SCS. In one embodiment, in response to the indication indicating that the UE does not support the mixed numerology, the method 100 further includes configuring the CSI-RS measurement expectation to not expect the UE to perform CSI-RS measurement on: a group of one or more symbols where the UE is configured to measure the SSB; a first symbol before the group of one or more symbols; and a second symbol after the group of one or more symbols. In another embodiment, in response to the indication indicating that the UE does not support the mixed numerology, the method 100 further includes configuring the SSB measurement expectation to not expect the UE to perform SSB measurement on: a group of one or more symbols where the UE is configured to measure the CSI-RS; a first symbol before the group of one or more symbols; and a second symbol after the group of one or more symbols. In yet another embodiment, the method 100 further includes, in response to the indication indicating that the UE does not support the mixed numerology, using a scaling factor to divide time resource allocation between CSI-RS based mobility measurement and SSB based mobility measurement.

In certain embodiments, the indication indicates whether the UE supports concurrent intra-frequency measurement on the serving cell or the neighboring cell for both the SSB with a first SCS and the CSI-RS for mobility with a second SCS, and the method 100 further includes configuring at least one of the CSI-RS and the PDCCH or PDSCH based on the indication. The indication may comprise, for example, a simultaneousCSIRSandSSB-DiffNumerology parameter in a set of UE capability parameters. In one such embodiment, in response to the indication indicating that the UE does not support the mixed numerology, the method includes configuring the CSI-RS measurement expectation to not expect the UE to perform CSI-RS measurement on: a group of one or more symbols where the UE is configured to measure the SSB; a first symbol before the group of one or more symbols; and a second symbol after the group of one or more symbols. In another embodiment, the method 100 further includes, in response to the indication indicating that the UE does not support the mixed numerology, configuring the SSB measurement expectation to not expect the UE to perform SSB measurement on: a group of one or more symbols where the UE is configured to measure the CSI-RS: a first symbol before the group of one or more symbols; and a second symbol after the group of one or more symbols. In another embodiment, in response to the indication indicating that the UE does not support the mixed numerology, using a scaling factor to divide time resource allocation between CSI-RS based mobility measurement and SSB based mobility measurement.

In one embodiment, the indication indicates whether the UE supports concurrent intra-frequency measurement on the serving cell or the neighboring cell on the CSI-RS for mobility with a first SCS and PDCCH or PDSCH reception at the UE from the serving cell with a second SCS, and the method 100 further includes configuring at least one of the CSI-RS and the PDCCH or PDSCH based on the indication. The indication may comprise, for example, a simultaneousRxDataCSIRS-DiffNumerology parameter in a set of UE capability parameters. In one such embodiment, in response to the indication indicating that the UE does not support the mixed numerology, the method 100 includes not scheduling the UE for the PDCCH or PDSCH reception on: a group of one or more symbols where the UE is configured to measure the CSI-RS; a first symbol before the group of one or more symbols: and a second symbol after the group of one or more symbols.

In certain embodiments, the indication indicates whether the UE supports concurrent intra-frequency measurement on the serving cell or the neighboring cell on the SSB with a first SCS, on the CSI-RS for mobility with a second SRS, and PDCCH or PDSCH reception at the UE from the serving cell with a third SCS, and the method 100 further includes configuring at least one of the CSI-RS and the PDCCH or PDSCH based on the indication. The indication may comprise, for example, a simultaneousRxDataCSIRSandSSB-DiffNumerology parameter in a set of UE capability parameters. In one such embodiment, in a first frequency range (FR1), the method 100 further includes selecting the first SCS from a first group comprising 15 kHz and 30 kHz, and selecting the second SCS and the third SCS from a second group comprising 30 kHz and 60 kHz; and in a second frequency range (FR2), selecting the first SCS from a third group comprising 120 kHz and 240 kHz, and selecting the second SCS and the third SCS from a fourth group comprising 60 kHz and 120 kHz. In certain such embodiments, the first SCS, the second SCS, and the third SCS are selected to be three different SCS values. In one embodiment, the method 100 further includes in response to the indication indicating that the UE does not support the mixed numerology, not expecting the UE to perform operations of receiving data, measuring the CSI-RS for mobility, and measuring the SSB when the operations collide on the time domain and use different SCS values for the first SCS, the second SCS, and the third SCS.

Figure 2:
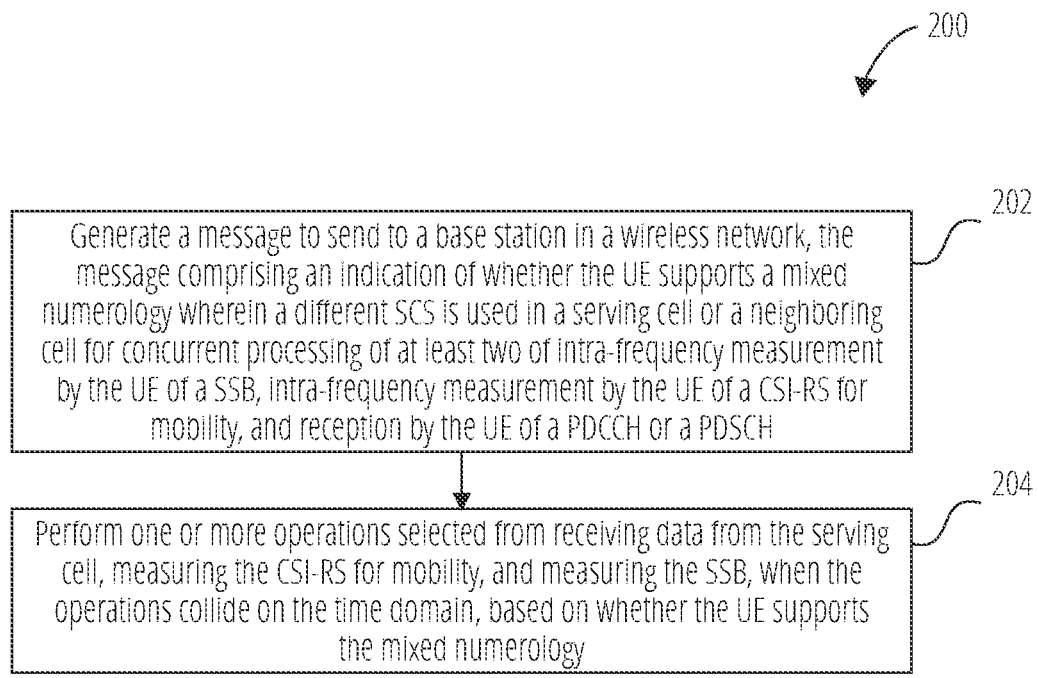
FIG. 2 illustrates a method for a user equipment (UE) in accordance with one embodiment.

FIG. 2 is a flowchart illustrating a method 200 for a UE, according to certain embodiments. In block 202, method 200 includes generating a message to send to a base station in a wireless network. The message includes an indication of whether the UE supports a mixed numerology wherein a different SCS is used in a serving cell or a neighboring cell for concurrent processing of at least two of: intra-frequency measurement by the UE of an SSB; intra-frequency measurement by the UE of a CSI-RS for mobility; and reception by the UE of a PDCCH or a PDSCH. In block 204, method 200 includes performing one or more operations selected from receiving data from the serving cell, measuring the CSI-RS for mobility, and measuring the SSB, when the operations collide on the time domain, based on whether the UE supports the mixed numerology.

In one embodiment of the method 200, the serving cell is configured with up to two SCS, wherein the SSB and the CSI-RS for mobility share a first SCS of the two SCS for the serving cell, and wherein the indication indicates whether the UE supports concurrent: intra-frequency measurements by the UE of the SSB or the CSI-RS for mobility using the first SCS; and reception of the PDCCH or the PDSCH by the UE from the serving cell using a second SCS of the two SCS.

In one embodiment of the method 200, the serving cell is configured with up to two SCS, wherein the CSI-RS for mobility and reception of the PDCCH or the PDSCH by the UE share a first SCS of the two SCS for the serving cell, and wherein the indication indicates whether the UE supports concurrent: intra-frequency measurements by the UE of the SSB using the first SCS; and reception of the PDCCH or the PDSCH by the UE from the serving cell, or intra-frequency measurements by the UE of the CSI-RS for mobility, using a second SCS of the two SCS.

In one embodiment of the method 200, the indication indicates whether the UE supports concurrent intra-frequency measurement on the serving cell or the neighboring cell for both the SSB with a first SCS and the CSI-RS for mobility with a second SCS.

In one embodiment of the method 200, the indication indicates whether the UE supports concurrent intra-frequency measurement on the serving cell or the neighboring cell on the CSI-RS for mobility with a first SCS and PDCCH or PDSCH reception at the UE from the serving cell with a second SCS.

In one embodiment of the method 200, the indication indicates whether the UE supports concurrent intra-frequency measurement on the serving cell or the neighboring cell on the SSB with a first SCS, on the CSI-RS for mobility with a second SRS, and PDCCH or PDSCH reception at the UE from the serving cell with a third SCS. In certain such embodiments, in a first frequency range (FR1), the method 200 includes selecting the first SCS from a first group comprising 15 kHz and 30 kHz, and selecting the second SCS and the third SCS from a second group comprising 30 kHz and 60 kHz; and in a second frequency range (FR2), selecting the first SCS from a third group comprising 120 kHz and 240 kHz, and selecting the second SCS and the third SCS from a fourth group comprising 60 kHz and 120 kHz. In certain embodiments, the first SCS, the second SCS, and the third SCS are selected to be three different SCS values.

Figure 3:
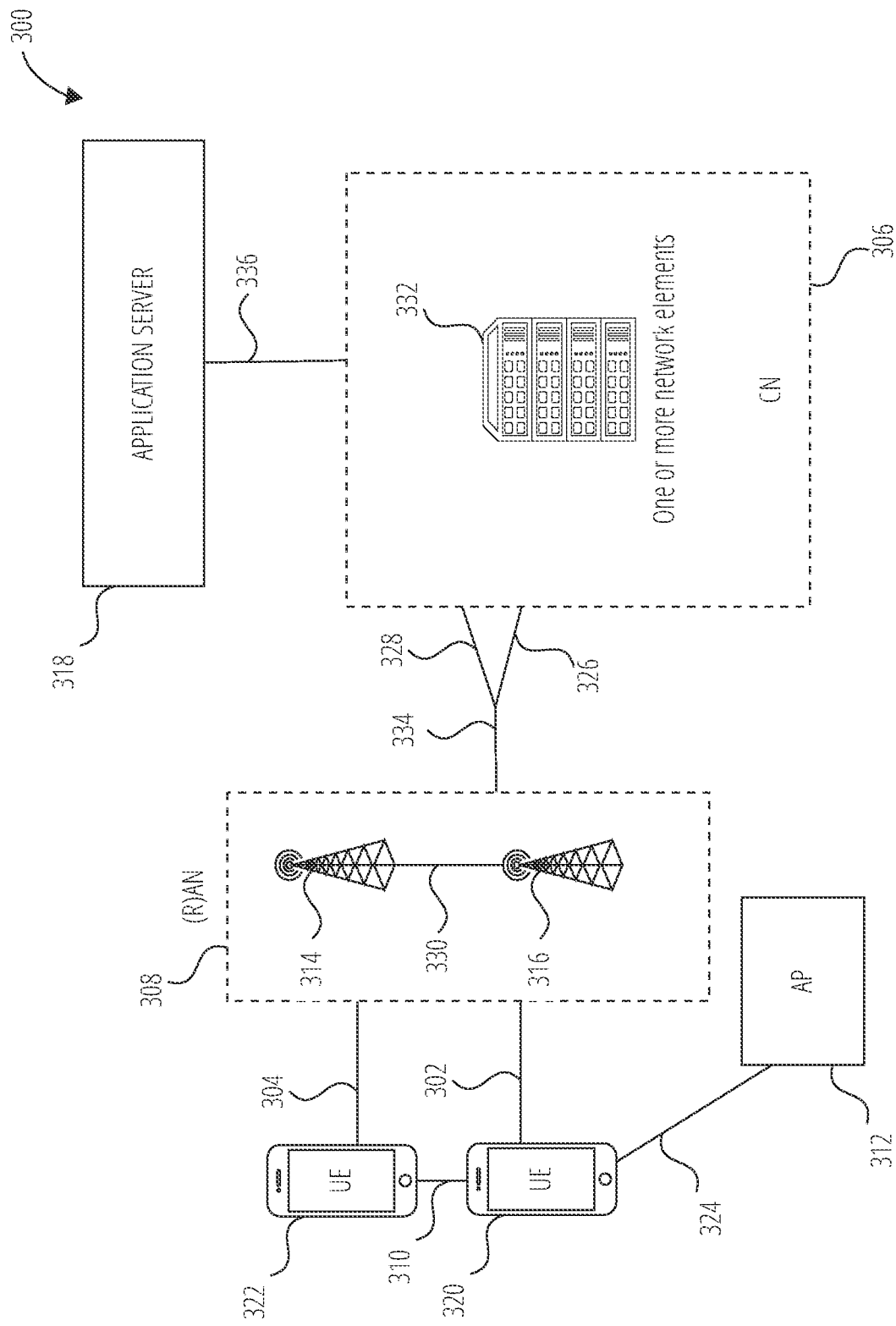
FIG. 3 illustrates a system in accordance with one embodiment.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems. IEEE 802.16 protocols (e.g., WMAN, WiMAX, etc.), or the like.

As shown by FIG. 3, the system 300 includes UE 322 and UE 320. In this example, the UE 322 and the UE 320 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 322 and/or the UE 320 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 322 and UE 320 may be configured to connect, for example, communicatively couple, with an access node or radio access node (shown as (R)AN 308). In embodiments, the (R)AN 308 may be an NG RAN or a 5G RAN, an E-UTRAN, or a legacy RAN, such as a UTRAN or GERAN. As used herein, the term "NG RAN" or the like may refer to a (R)AN 308 that operates in an NR or 5G system, and the term "E-UTRAN" or the like may refer to a (R)AN 308 that operates in an LTE or 4G system. The UE 322 and UE 320 utilize connections (or channels) (shown as connection 304 and connection 302, respectively), each of which comprises a physical communications interface or layer (discussed in further detail below).

In this example, the connection 304 and connection 302 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 322 and UE 320 may directly exchange communication data via a ProSe interface 310. The ProSe interface 310 may alternatively be referred to as a sidelink (SL) interface 110 and may comprise one or more logical channels, including but not limited to a PSCCH, a PSSCH, a PSDCH, and a PSBCH.

The UE 320 is shown to be configured to access an AP 312 (also referred to as "WLAN node," "WLAN," "WLAN Termination," "WT" or the like) via connection 324. The connection 324 can comprise a local wireless connection, such as a connection consistent with any IEEE 802.11 protocol, wherein the AP 312 would comprise a wireless fidelity (Wi-Fi®) router. In this example, the AP 312 may be connected to the Internet without connecting to the core network of the wireless system (described in further detail below). In various embodiments, the UE 320, (R)AN 308, and AP 312 may be configured to utilize LWA operation and/or LWIP operation. The LWA operation may involve the UE 320 in RRC_CONNECTED being configured by the RAN node 314 or the RAN node 316 to utilize radio resources of LTE and WLAN. LWIP operation may involve the UE 320 using WLAN radio resources (e.g., connection 324) via IPsec protocol tunneling to authenticate and encrypt packets (e.g., IP packets) sent over the connection 324. IPsec tunneling may include encapsulating the entirety of original IP packets and adding a new packet header, thereby protecting the original header of the IP packets.

The (R)AN 308 can include one or more AN nodes, such as RAN node 314 and RAN node 316, that enable the connection 304 and connection 302. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs. and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 300 (e.g., an eNB). According to various embodiments, the RAN node 314 or RAN node 316 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 314 or RAN node 316 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 314 or RAN node 316), a MAC/PHY split wherein RRC, PDCP, RLC, and MAC layers are operated by the CRAN/vBBUP and the PHY layer is operated by individual RAN nodes (e.g., RAN node 314 or RAN node 316); or a "lower PHY" split wherein RRC, PDCP, RLC. MAC layers and upper portions of the PHY layer are operated by the CRAN/vBBUP and lower portions of the PHY layer are operated by individual RAN nodes. This virtualized framework allows the freed-up processor cores of the RAN node 314 or RAN node 316 to perform other virtualized applications. In some implementations, an individual RAN node may represent individual gNB-DUs that are connected to a gNB-CU via individual F1 interfaces (not shown by FIG. 3). In these implementations, the gNB-DUs may include one or more remote radio heads or RFEMs, and the gNB-CU may be operated by a server that is located in the (R)AN 308 (not shown) or by a server pool in a similar manner as the CRAN/vBBUP. Additionally, or alternatively, one or more of the RAN node 314 or RAN node 316 may be next generation eNBs (ng-eNBs), which are RAN nodes that provide E-UTRA user plane and control plane protocol terminations toward the UE 322 and UE 320, and are connected to an SGC via an NG interface (discussed infra). In V2X scenarios one or more of the RAN node 314 or RAN node 316 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 314 and/or the RAN node 316 can terminate the air interface protocol and can be the first point of contact for the UE 322 and UE 320. In some embodiments, the RAN node 314 and/or the RAN node 316 can fulfill various logical functions for the (R)AN 308 including, but not limited to, radio network controller (RNC) functions such as radio bearer management, uplink and downlink dynamic radio resource management and data packet scheduling, and mobility management.

In embodiments, the UE 322 and UE 320 can be configured to communicate using OFDM communication signals with each other or with the RAN node 314 and/or the RAN node 316 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 314 and/or the RAN node 316 to the UE 322 and UE 320, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

According to various embodiments, the UE 322 and UE 320 and the RAN node 314 and/or the RAN node 316 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 322 and UE 320 and the RAN node 314 or RAN node 316 may operate using LAA, eLAA, and/or feLAA mechanisms. In these implementations, the UE 322 and UE 320 and the RAN node 314 or RAN node 316 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 322 and UE 320, RAN node 314 or RAN node 316, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 322, AP 312, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 322 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 322 and UE 320. The PDCCH carries information about the transport format and resource allocations related to the PDSCH channel, among other things. It may also inform the UE 322 and UE 320 about the transport format, resource allocation, and HARQ information related to the uplink shared channel. Typically, downlink scheduling (assigning control and shared channel resource blocks to the UE 320 within a cell) may be performed at any of the RAN node 314 or RAN node 316 based on channel quality information fed back from any of the UE 322 and UE 320. The downlink resource assignment information may be sent on the PDCCH used for (e.g., assigned to) each of the UE 322 and UE 320.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 314 or RAN node 316 may be configured to communicate with one another via interface 330. In embodiments where the system 300 is an LTE system (e.g., when CN 306 is an EPC), the interface 330 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB:

information about successful in sequence delivery of PDCP PDUs to a UE 322 from an SeNB for user data; information of PDCP PDUs that were not delivered to a UE 322; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 300 is a 5G or NR system (e.g., when CN 306 is an 5GC), the interface 330 may be an Xn interface. The Xn interface is defined between two or more RAN nodes (e.g., two or more gNBs and the like) that connect to 5GC, between a RAN node 314 (e.g., a gNB) connecting to 5GC and an eNB, and/or between two eNBs connecting to 5GC (e.g., CN 306). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 322 in a connected mode (e.g., CM-CONNECTED) including functionality to manage the UE mobility for connected mode between one or more RAN node 314 or RAN node 316. The mobility support may include context transfer from an old (source) serving RAN node 314 to new (target) serving RAN node 316; and control of user plane tunnels between old (source) serving RAN node 314 to new (target) serving RAN node 316. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 308 is shown to be communicatively coupled to a core network-in this embodiment, CN 306. The CN 306 may comprise one or more network elements 332, which are configured to offer various data and telecommunications services to customers/subscribers (e.g., users of UE 322 and UE 320) who are connected to the CN 306 via the (R)AN 308. The components of the CN 306 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 306 may be referred to as a network slice, and a logical instantiation of a portion of the CN 306 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 318 may be an element offering applications that use IP bearer resources with the core network (e.g., UMTS PS domain, LTE PS data services, etc.). The application server 318 can also be configured to support one or more communication services (e.g., VoIP sessions, PTT sessions, group communication sessions, social networking services, etc.) for the UE 322 and UE 320 via the EPC. The application server 318 may communicate with the CN 306 through an IP communications interface 336.

In embodiments, the CN 306 may be an 5GC, and the (R)AN 116 may be connected with the CN 306 via an NG interface 334. In embodiments, the NG interface 334 may be split into two parts, an NG user plane (NG-U) interface 326, which carries traffic data between the RAN node 314 or RAN node 316 and a UPF, and the S1 control plane (NG-C) interface 328, which is a signaling interface between the RAN node 314 or RAN node 316 and AMFs.

In embodiments, the CN 306 may be a 5G CN, while in other embodiments, the CN 306 may be an EPC). Where CN 306 is an EPC, the (R)AN 116 may be connected with the CN 306 via an S1 interface 334. In embodiments, the S1 interface 334 may be split into two parts, an S1 user plane (S1-U) interface 326, which carries traffic data between the RAN node 314 or RAN node 316 and the S-GW, and the S1-MME interface 328, which is a signaling interface between the RAN node 314 or RAN node 316 and MMEs.

Figure 4:
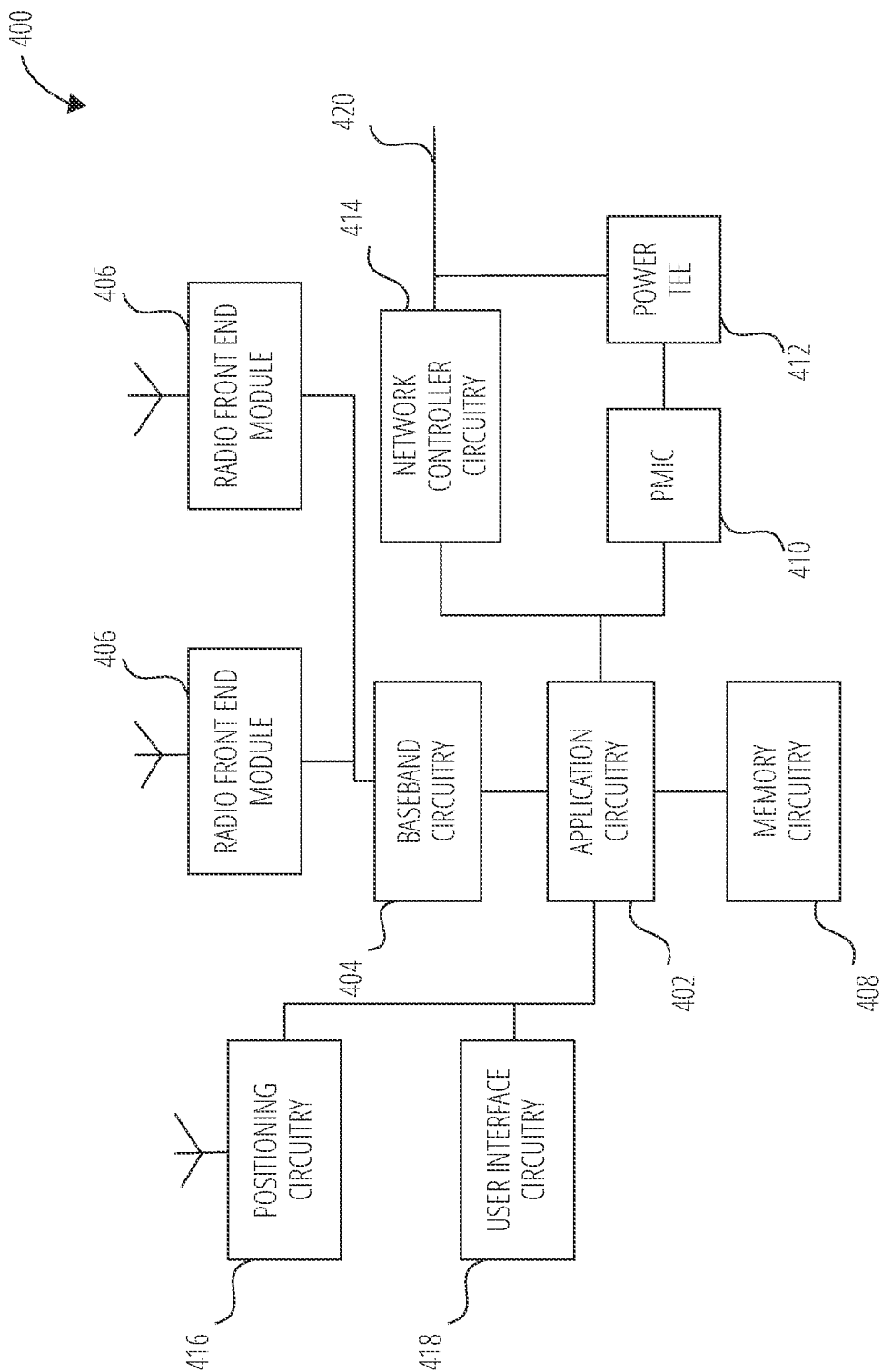
FIG. 4 illustrates an infrastructure equipment in accordance with one embodiment.

FIG. 4 illustrates an example of infrastructure equipment 400 in accordance with various embodiments. The infrastructure equipment 400 may be implemented as a base station, radio head, RAN node, AN, application server, and/or any other element/device discussed herein. In other examples, the infrastructure equipment 400 could be implemented in or by a UE.

The infrastructure equipment 400 includes application circuitry 402, baseband circuitry 404, one or more radio front end module 406 (RFEM), memory circuitry 408, power management integrated circuitry (shown as PMIC 410), power tee circuitry 412, network controller circuitry 414, network interface connector 420, satellite positioning circuitry 416, and user interface circuitry 418. In some embodiments, the device infrastructure equipment 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 402 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 402 may be coupled with or may include memory/storage elements and may be configured to execute instructions stored in the memory/storage to enable various applications or operating systems to run on the infrastructure equipment 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 402 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 402 may comprise, or may be, a special-purpose processor/controller to operate according to the various embodiments herein. As examples, the processor(s) of application circuitry 402 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 400 may not utilize application circuitry 402, and instead may include a special-purpose processor/controller to process IP data received from an EPC or 5GC, for example.

In some implementations, the application circuitry 402 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs): and the like. In such implementations, the circuitry of application circuitry 402 may comprise logic blocks or logic fabric, and other interconnected resources that may be programmed to perform various functions, such as the procedures, methods, functions, etc. of the various embodiments discussed herein. In such embodiments, the circuitry of application circuitry 402 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 404 may be implemented, for example, as a solder-down substrate including one or more integrated circuits, a single packaged integrated circuit soldered to a main circuit board or a multi-chip module containing two or more integrated circuits.

The user interface circuitry 418 may include one or more user interfaces designed to enable user interaction with the infrastructure equipment 400 or peripheral component interfaces designed to enable peripheral component interaction with the infrastructure equipment 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 406 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 406, which incorporates both mmWave antennas and sub-mmWave.

The memory circuitry 408 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 408 may be implemented as one or more of solder down packaged integrated circuits, socketed memory modules and plug-in memory cards.

The PMIC 410 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 412 may provide for electrical power drawn from a network cable to provide both power supply and data connectivity to the infrastructure equipment 400 using a single cable.

The network controller circuitry 414 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 420 using a physical connection, which may be electrical (commonly referred to as a "copper interconnect"), optical, or wireless. The network controller circuitry 414 may include one or more dedicated processors and/or FPGAs to communicate using one or more of the aforementioned protocols. In some implementations, the network controller circuitry 414 may include multiple controllers to provide connectivity to other networks using the same or different protocols.

The positioning circuitry 416 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 416 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 416 may include a Micro-Technology for Positioning, Navigation, and Timing (Micro-PNT) IC that uses a master timing clock to perform position tracking/estimation without GNSS assistance. The positioning circuitry 416 may also be part of, or interact with, the baseband circuitry 404 and/or radio front end module 406 to communicate with the nodes and components of the positioning network. The positioning circuitry 416 may also provide position data and/or time data to the application circuitry 402, which may use the data to synchronize operations with various infrastructure, or the like. The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 5:
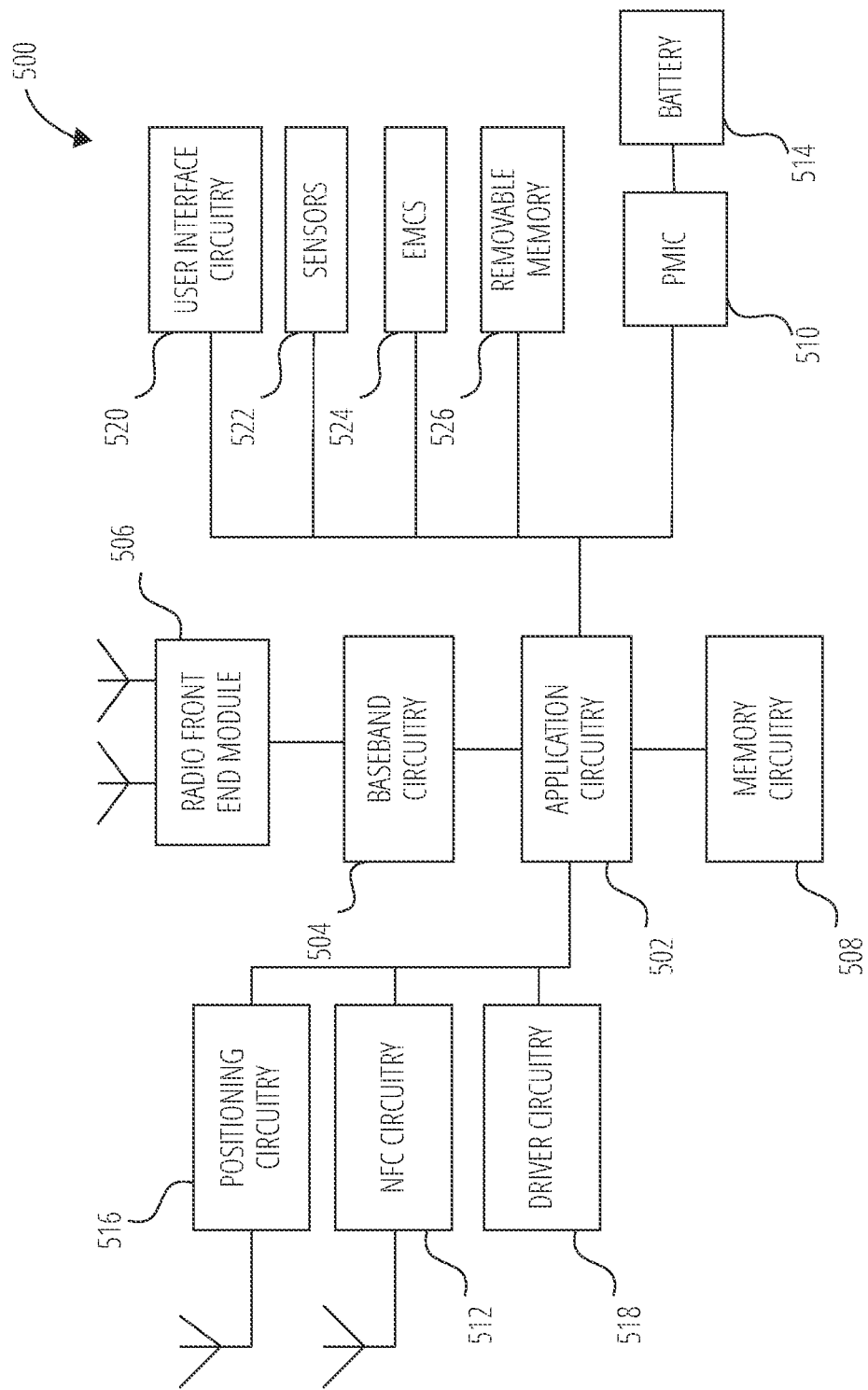
FIG. 5 illustrates a platform in accordance with one embodiment.

FIG. 5 illustrates an example of a platform 500 in accordance with various embodiments. In embodiments, the computer platform 500 may be suitable for use as UEs, application servers, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 502 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose 10, memory card controllers such as SD MMC or similar, USB interfaces, MIPI interfaces, and JTAG test access ports. The processors (or cores) of the application circuitry 502 may be coupled with or may include memory/storage elements and may be configured to execute instructions stored in the memory/storage to enable various applications or operating systems to run on the platform 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 502 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 502 may comprise, or may be, a special-purpose processor/controller to operate according to the various embodiments herein.

As examples, the processor(s) of application circuitry 502 may include an Intel® Architecture Core™ based processor, such as a Quark™, an Atom™, an i3, an i5, an i7, or an MCU-class processor, or another such processor available from Intel® Corporation. The processors of the application circuitry 502 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s): a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 502 may be a part of a system on a chip (SoC) in which the application circuitry 502 and other components are formed into a single integrated circuit, or a single package, such as the Edison™ or Galileo™ SoC boards from Intel® Corporation.

Additionally or alternatively, application circuitry 502 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like: programmable SoCs (PSoCs); and the like. In such embodiments, the circuitry of application circuitry 502 may comprise logic blocks or logic fabric, and other interconnected resources that may be programmed to perform various functions, such as the procedures, methods, functions, etc. of the various embodiments discussed herein. In such embodiments, the circuitry of application circuitry 502 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 504 may be implemented, for example, as a solder-down substrate including one or more integrated circuits, a single packaged integrated circuit soldered to a main circuit board or a multi-chip module containing two or more integrated circuits.

The radio front end module 506 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 506, which incorporates both mmWave antennas and sub-mmWave.

The memory circuitry 508 may include any number and type of memory devices used to provide for a given amount of system memory. As examples, the memory circuitry 508 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 508 may be developed in accordance with a Joint Electron Devices Engineering Council (JEDEC) low power double data rate (LPDDR)-based design, such as LPDDR2, LPDDR3, LPDDR4, or the like. Memory circuitry 508 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 508 maybe on-die memory or registers associated with the application circuitry 502. To provide for persistent storage of information such as data, applications, operating systems and so forth, memory circuitry 508 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 500 may incorporate the three-dimensional (3D) cross-point (XPOINT) memories from Intel® and Micron®.

The removable memory 526 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensors 522 and electro-mechanical components (shown as EMCs 524), as well as removable memory devices coupled to removable memory 526.

The sensors 522 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 524 include devices, modules, or subsystems whose purpose is to enable platform 500 to change its state, position, and/or orientation, or move or control a mechanism or (sub)system. Additionally. EMCs 524 may be configured to generate and send messages/signaling to other components of the platform 500 to indicate a current state of the EMCs 524. Examples of the EMCs 524 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 524 based on one or more captured events and/or instructions or control signals received from a service provider and/or various clients. In some implementations, the interface circuitry may connect the platform 500 with positioning circuitry 516. The positioning circuitry 516 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 516 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 516 may include a Micro-PNT IC that uses a master timing clock to perform position tracking/estimation without GNSS assistance. The positioning circuitry 516 may also be part of, or interact with, the baseband circuitry 504 and/or radio front end module 506 to communicate with the nodes and components of the positioning network. The positioning circuitry 516 may also provide position data and/or time data to the application circuitry 502, which may use the data to synchronize operations with various infrastructure (e.g., radio base stations), for turn-by-turn navigation applications, or the like.

In some implementations, the interface circuitry may connect the platform 500 with Near-Field Communication circuitry (shown as NFC circuitry 512). The NFC circuitry 512 is configured to provide contactless, short-range communications based on radio frequency identification (RFID) standards, wherein magnetic field induction is used to enable communication between NFC circuitry 512 and NFC-enabled devices external to the platform 500 (e.g., an "NFC touchpoint"). NFC circuitry 512 comprises an NFC controller coupled with an antenna element and a processor coupled with the NFC controller. The NFC controller may be a chip/IC providing NFC functionalities to the NFC circuitry 512 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 512, or initiate data transfer between the NFC circuitry 512 and another active NFC device (e.g., a smartphone or an NFC-enabled POS terminal) that is proximate to the platform 500.

The driver circuitry 518 may include software and hardware elements that operate to control particular devices that are embedded in the platform 500, attached to the platform 500, or otherwise communicatively coupled with the platform 500. The driver circuitry 518 may include individual drivers allowing other components of the platform 500 to interact with or control various input/output (I/O) devices that may be present within, or connected to, the platform 500. For example, driver circuitry 518 may include a display driver to control and allow access to a display device, a touchscreen driver to control and allow access to a touchscreen interface of the platform 500, sensor drivers to obtain sensor readings of sensors 522 and control and allow access to sensors 522, EMC drivers to obtain actuator positions of the EMCs 524 and/or control and allow access to the EMCs 524, a camera driver to control and allow access to an embedded image capture device, audio drivers to control and allow access to one or more audio devices.

The power management integrated circuitry (shown as PMIC 510) (also referred to as "power management circuitry") may manage power provided to various components of the platform 500. In particular, with respect to the baseband circuitry 504, the PMIC 510 may control power-source selection, voltage scaling, battery charging, or DC-to-DC conversion. The PMIC 510 may often be included when the platform 500 is capable of being powered by a battery 514, for example, when the device is included in a UE.

In some embodiments, the PMIC 510 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 514 may power the platform 500, although in some examples the platform 500 may be mounted deployed in a fixed location, and may have a power supply coupled to an electrical grid. The battery 514 may be a lithium ion battery, a metal-air battery, such as a zinc-air battery, an aluminum-air battery, a lithium-air battery, and the like. In some implementations, such as in V2X applications, the battery 514 may be a typical lead-acid automotive battery.

In some implementations, the battery 514 may be a "smart battery," which includes or is coupled with a Battery Management System (BMS) or battery monitoring integrated circuitry. The BMS may be included in the platform 500 to track the state of charge (SoCh) of the battery 514. The BMS may be used to monitor other parameters of the battery 514 to provide failure predictions, such as the state of health (SoH) and the state of function (SoF) of the battery 514. The BMS may communicate the information of the battery 514 to the application circuitry 502 or other components of the platform 500. The BMS may also include an analog-to-digital (ADC) convertor that allows the application circuitry 502 to directly monitor the voltage of the battery 514 or the current flow from the battery 514. The battery parameters may be used to determine actions that the platform 500 may perform, such as transmission frequency, network operation, sensing frequency, and the like.

A power block, or other power supply coupled to an electrical grid may be coupled with the BMS to charge the battery 514. In some examples, the power block may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 514, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 520 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 520 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touch-screens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensors 522 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 6:
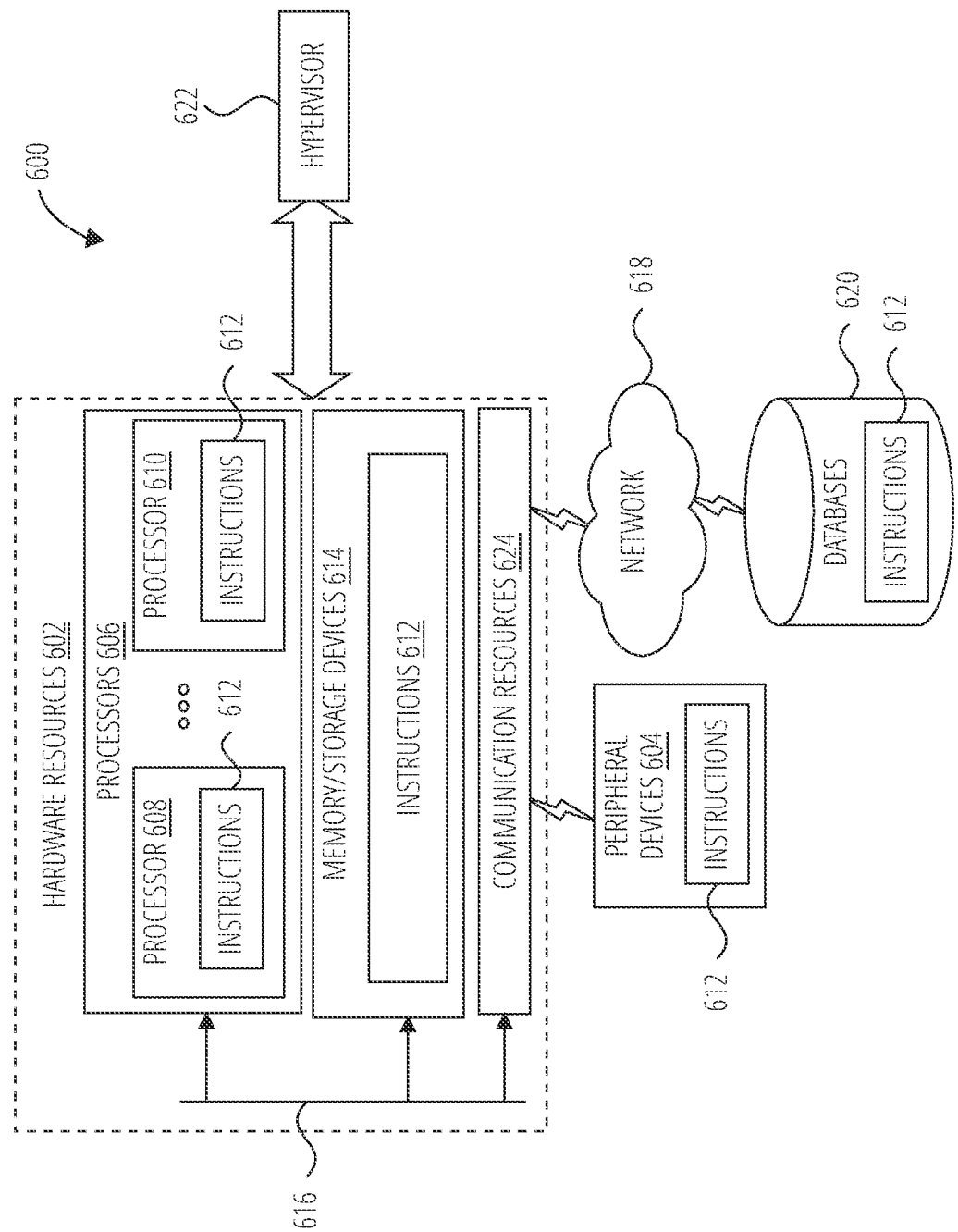
FIG. 6 illustrates components in accordance with one embodiment.

FIG. 6 is a block diagram illustrating components 600, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 602 including one or more processors 606 (or processor cores), one or more memory/storage devices 614, and one or more communication resources 624, each of which may be communicatively coupled via a bus 616. For embodiments where node virtualization (e.g., NFV) is utilized, a hypervisor 622 may be executed to provide an execution environment for one or more network slices/sub-slices to utilize the hardware resources 602.

The processors 606 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 608 and a processor 610.

The memory/storage devices 614 may include main memory, disk storage, or any suitable combination thereof. The memory/storage devices 614 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 624 may include interconnection or network interface components or other suitable devices to communicate with one or more peripheral devices 604 or one or more databases 620 via a network 618. For example, the communication resources 624 may include wired communication components (e.g., for coupling via a Universal Serial Bus (USB)), cellular communication components, NFC components, Bluetooth® components (e.g., Bluetooth®, Low Energy), Wi-Fi® components, and other communication components.

Instructions 612 may comprise software, a program, an application, an applet, an app, or other executable code for causing at least any of the processors 606 to perform any one or more of the methodologies discussed herein. The instructions 612 may reside, completely or partially, within at least one of the processors 606 (e.g., within the processor's cache memory), the memory/storage devices 614, or any suitable combination thereof. Furthermore, any portion of the instructions 612 may be transferred to the hardware resources 602 from any combination of the peripheral devices 604 or the databases 620. Accordingly, the memory of the processors 606, the memory/storage devices 614, the peripheral devices 604, and the databases 620 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method for a wireless network. The method includes decoding a message from a user equipment (UE). The message comprises an indication of whether the UE supports a mixed numerology wherein a different subcarrier spacing (SCS) is used in a serving cell or a neighboring cell for concurrent processing of at least two of: intra-frequency measurement by the UE of a synchronization signal block (SSB); intra-frequency measurement by the UE of a channel state information reference signal (CSI-RS) for mobility; and reception by the UE of a physical downlink control channel (PDCCH) or a physical downlink shared channel (PDSCH). The method further comprising, based on the indication, configuring at least one of a CSI-RS measurement expectation, an SSB measurement expectation, and a scheduling restriction for reception of the PDCCH or the PDSCH by the UE.

Example 2 includes the method of Example 1, further comprising: configuring up to two SCS for the serving cell, wherein the SSB and the CSI-RS for mobility share a first SCS of the two SCS for the serving cell, and wherein the indication indicates whether the UE supports concurrent: intra-frequency measurements by the UE of the SSB or the CSI-RS for mobility using the first SCS; and reception of the PDCCH or the PDSCH by the UE from the serving cell using a second SCS of the two SCS.

Example 3 includes the method of Example 2, further comprising, in response to the indication indicating that the UE does not support the mixed numerology, configuring the scheduling restriction to not schedule the UE for reception of the PDCCH or the PDSCH on: a group of one or more symbols where the UE is configured to measure the SSB or the CSI-RS; a first symbol before the group of one or more symbols; and a second symbol after the group of one or more symbols.

Example 4 includes the method of Example 1, further comprising: configuring up to two SCS for the serving cell, wherein the CSI-RS for mobility and reception of the PDCCH or the PDSCH by the UE share a first SCS of the two SCS for the serving cell, and wherein the indication indicates whether the UE supports concurrent: reception of the PDCCH or the PDSCH by the UE from the serving cell, or intra-frequency measurements by the UE of the CSI-RS for mobility, using the first SCS; and intra-frequency measurements by the UE of the SSB using a second SCS of the two SCS.

Example 5 includes the method of Example 4, further comprising, in response to the indication indicating that the UE does not support the mixed numerology, configuring the CSI-RS measurement expectation to not expect the UE to perform CSI-RS measurement on: a group of one or more symbols where the UE is configured to measure the SSB; a first symbol before the group of one or more symbols; and a second symbol after the group of one or more symbols.

Example 6 includes the method of Example 4, further comprising, in response to the indication indicating that the UE does not support the mixed numerology, configuring the SSB measurement expectation to not expect the UE to perform SSB measurement on: a group of one or more symbols where the UE is configured to measure the CSI-RS: a first symbol before the group of one or more symbols; and a second symbol after the group of one or more symbols.

Example 7 includes the method of Example 4, further comprising, in response to the indication indicating that the UE does not support the mixed numerology, using a scaling factor to divide time resource allocation between CSI-RS based mobility measurement and SSB based mobility measurement.

Example 8 includes the method of any of Example 2 to Example 7, wherein the indication comprises a simultaneousRxDataSSB-DiffNumerology parameter in a set of UE capability parameters.

Example 9 includes the method of Example 1, wherein the indication indicates whether the UE supports concurrent intra-frequency measurement on the serving cell or the neighboring cell for both the SSB with a first SCS and the CSI-RS for mobility with a second SCS, the method further comprising configuring at least one of the CSI-RS and the PDCCH or PDSCH based on the indication.

Example 10 includes the method of Example 9, further comprising, in response to the indication indicating that the UE does not support the mixed numerology, configuring the CSI-RS measurement expectation to not expect the UE to perform CSI-RS measurement on: a group of one or more symbols where the UE is configured to measure the SSB; a first symbol before the group of one or more symbols; and a second symbol after the group of one or more symbols.

Example 11 includes the method of Example 9, further comprising, in response to the indication indicating that the UE does not support the mixed numerology, configuring the SSB measurement expectation to not expect the UE to perform SSB measurement on: a group of one or more symbols where the UE is configured to measure the CSI-RS; a first symbol before the group of one or more symbols; and a second symbol after the group of one or more symbols.

Example 12 includes the method of Example 9, further comprising, in response to the indication indicating that the UE does not support the mixed numerology, using a scaling factor to divide time resource allocation between CSI-RS based mobility measurement and SSB based mobility measurement.

Example 13 includes the method of any of Example 9 to Example 12, wherein the indication comprises a simultaneousCSIRSandSSB-DiffNumerology parameter in a set of UE capability parameters.

Example 14 includes the method of Example 1, wherein the indication indicates whether the UE supports concurrent intra-frequency measurement on the serving cell or the neighboring cell on the CSI-RS for mobility with a first SCS and PDCCH or PDSCH reception at the UE from the serving cell with a second SCS, the method further comprising configuring at least one of the CSI-RS and the PDCCH or PDSCH based on the indication.

Example 15 includes the method of Example 14, further comprising, in response to the indication indicating that the UE does not support the mixed numerology, not scheduling the UE for the PDCCH or PDSCH reception on: a group of one or more symbols where the UE is configured to measure the CSI-RS: a first symbol before the group of one or more symbols; and a second symbol after the group of one or more symbols.

Example 16 includes the method of any of Example 14 to Example 15, wherein the indication comprises a simultaneousRxDataCSIRS-DiffNumerology parameter in a set of UE capability parameters.

Example 17 includes the method of Example 1, wherein the indication indicates whether the UE supports concurrent intra-frequency measurement on the serving cell or the neighboring cell on the SSB with a first SCS, on the CSI-RS for mobility with a second SRS, and PDCCH or PDSCH reception at the UE from the serving cell with a third SCS, the method further comprising configuring at least one of the CSI-RS and the PDCCH or PDSCH based on the indication.

Example 18 includes the method of Example 17, further comprising: in a first frequency range (FR1), selecting the first SCS from a first group comprising 15 kHz and 30 kHz, and selecting the second SCS and the third SCS from a second group comprising 30 kHz and 60 kHz; and in a second frequency range (FR2), selecting the first SCS from a third group comprising 120 kHz and 240 kHz, and selecting the second SCS and the third SCS from a fourth group comprising 60 kHz and 120 kHz.

Example 19 includes the method of Example 17, further comprising, in response to the indication indicating that the UE does not support the mixed numerology, not expect the UE to perform operations of receiving data, measuring the CSI-RS for mobility, and measuring the SSB when the operations collide on the time domain and use different SCS values for the first SCS, the second SCS, and the third SCS.

Example 20 includes the method of any of Example 17 to Example 19, wherein the indication comprises a simultaneousRxDataCSIRSandSSB-DiffNumerology parameter in a set of UE capability parameters.

Example 21 is a method for a user equipment (UE), the method comprising: generating a message to send to a base station in a wireless network, the message comprising an indication of whether the UE supports a mixed numerology wherein a different subcarrier spacing (SCS) is used in a serving cell or a neighboring cell for concurrent processing of at least two of: intra-frequency measurement by the UE of a synchronization signal block (SSB); intra-frequency measurement by the UE of a channel state information reference signal (CSI-RS) for mobility; and reception by the UE of a physical downlink control channel (PDCCH) or a physical downlink shared channel (PDSCH): and performing one or more operations selected from receiving data from the serving cell, measuring the CSI-RS for mobility, and measuring the SSB, when the operations collide on the time domain, based on whether the UE supports the mixed numerology.

Example 22 includes the method of Example 21, wherein the serving cell is configured with up to two SCS, wherein the SSB and the CSI-RS for mobility share a first SCS of the two SCS for the serving cell, and wherein the indication indicates whether the UE supports concurrent: intra-frequency measurements by the UE of the SSB or the CSI-RS for mobility using the first SCS; and reception of the PDCCH or the PDSCH by the UE from the serving cell using a second SCS of the two SCS.

Example 23 includes the method of Example 21, wherein the serving cell is configured with up to two SCS, wherein the CSI-RS for mobility and reception of the PDCCH or the PDSCH by the UE share a first SCS of the two SCS for the serving cell, and wherein the indication indicates whether the UE supports concurrent: reception of the PDCCH or the PDSCH by the UE from the serving cell, or intra-frequency measurements by the UE of the CSI-RS for mobility, using a first SCS; and intra-frequency measurements by the UE of the SSB using a second SCS of the two SCS.

Example 24 includes the method of Example 21, wherein the indication indicates whether the UE supports concurrent intra-frequency measurement on the serving cell or the neighboring cell for both the SSB with a first SCS and the CSI-RS for mobility with a second SCS.

Example 25 includes the method of Example 21, wherein the indication indicates whether the UE supports concurrent intra-frequency measurement on the serving cell or the neighboring cell on the CSI-RS for mobility with a first SCS and PDCCH or PDSCH reception at the UE from the serving cell with a second SCS.

Example 26 includes the method of Example 21, wherein the indication indicates whether the UE supports concurrent intra-frequency measurement on the serving cell or the neighboring cell on the SSB with a first SCS, on the CSI-RS for mobility with a second SRS, and PDCCH or PDSCH reception at the UE from the serving cell with a third SCS.

Example 27 includes the method of Example 26, further comprising: in a first frequency range (FR1), selecting the first SCS from a first group comprising 15 kHz and 30 kHz, and selecting the second SCS and the third SCS from a second group comprising 30 kHz and 60 kHz; and in a second frequency range (FR2), selecting the first SCS from a third group comprising 120 kHz and 240 kHz, and selecting the second SCS and the third SCS from a fourth group comprising 60 kHz and 120 kHz.

Example 28 includes the method of Example 27, wherein the first SCS, the second SCS, and the third SCS are selected to be three different SCS values.

Example 29 is a computer-readable storage medium including instructions that, when processed by a computer, configure the processor to perform the method of any of Example 1 to Example 28.

Example 30 is a computing apparatus including a processor and a memory storing instructions that, when executed by the processor, configure the apparatus to perform the method of any of Example 1 to Example 28.

Example 31 may include an apparatus comprising means to perform one or more elements of a method described in or related to any of the above Examples, or any other method or process described herein.

Example 32 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 33 may include an apparatus comprising logic, modules, or circuitry to perform one or more elements of a method described in or related to any of the above Examples, or any other method or process described herein.

Example 34 may include a method, technique, or process as described in or related to any of the above Examples, or portions or parts thereof.

Example 35 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 36 may include a signal as described in or related to any of the above Examples, or portions or parts thereof.

Example 37 may include a datagram, packet, frame, segment, protocol data unit (PDU), or message as described in or related to any of the above Examples, or portions or parts thereof, or otherwise described in the present disclosure.

Example 38 may include a signal encoded with data as described in or related to any of the above Examples, or portions or parts thereof, or otherwise described in the present disclosure.

Example 39 may include a signal encoded with a datagram, packet, frame, segment, PDU, or message as described in or related to any of the above Examples, or portions or parts thereof, or otherwise described in the present disclosure.

Example 40 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 41 may include a computer program comprising instructions, wherein execution of the program by a processing element is to cause the processing element to carry out the method, techniques, or process as described in or related to any of the above Examples, or portions thereof.

Example 42 may include a signal in a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a wireless network, the method comprising:
   decoding a message from a user equipment (UE), the message comprising an indication of whether the UE supports a mixed numerology wherein a different sub-carrier spacing (SCS) is used in a serving cell or a neighboring cell for concurrent processing of at least two of:
      intra-frequency measurement by the UE of a synchronization signal block (SSB);
      intra-frequency measurement by the UE of a channel state information reference signal (CSI-RS) for mobility; and
      reception by the UE of a physical downlink control channel (PDCCH) or a physical downlink shared channel (PDSCH);
   wherein the indication indicates whether the UE supports concurrent intra-frequency measurement on the serving cell or the neighboring cell for both the SSB with a first SCS and the CSI-RS for mobility with a second SCS;
   based on the indication, configuring at least one of a CSI-RS measurement expectation, an SSB measurement expectation, and a scheduling restriction for reception of the PDCCH or the PDSCH by the UE;
   based on the indication, configuring at least one of the CSI-RS and the PDCCH or PDSCH; and
   responsive to the indication indicating that the UE does not support the mixed numerology, using a scaling factor to divide time resource allocation between CSI-RS based mobility measurement and SSB based mobility measurement.

2. The method of claim 1, further comprising:
   configuring up to two SCS for the serving cell, wherein the SSB and the CSI-RS for mobility share a first SCS of the two SCS for the serving cell, and
   wherein the indication indicates whether the UE supports concurrent:
   intra-frequency measurements by the UE of the SSB or the CSI-RS for mobility using the first SCS; and
   reception of the PDCCH or the PDSCH by the UE from the serving cell using a second SCS of the two SCS.

3. The method of claim 2, further comprising, in response to the indication indicating that the UE does not support the mixed numerology, configuring the scheduling restriction to not schedule the UE for reception of the PDCCH or the PDSCH on:
   a group of one or more symbols where the UE is configured to measure the SSB or the CSI-RS;
   a first symbol before the group of one or more symbols; and
   a second symbol after the group of one or more symbols.

4. The method of claim 1, further comprising:
   configuring up to two SCS for the serving cell, wherein the CSI-RS for mobility and reception of the PDCCH or the PDSCH by the UE share a first SCS of the two SCS for the serving cell, and
   wherein the indication indicates whether the UE supports concurrent:
   reception of the PDCCH or the PDSCH by the UE from the serving cell, or intra-frequency measurements by the UE of the CSI-RS for mobility, using the first SCS; and
   intra-frequency measurements by the UE of the SSB using a second SCS of the two SCS.

5. The method of claim 4, further comprising, in response to the indication indicating that the UE does not support the mixed numerology, configuring the CSI-RS measurement expectation to not expect the UE to perform CSI-RS measurement on:
   a group of one or more symbols where the UE is configured to measure the SSB;
   a first symbol before the group of one or more symbols; and
   a second symbol after the group of one or more symbols.

6. The method of claim 4, further comprising, in response to the indication indicating that the UE does not support the mixed numerology, configuring the SSB measurement expectation to not expect the UE to perform SSB measurement on:
   a group of one or more symbols where the UE is configured to measure the CSI-RS;
   a first symbol before the group of one or more symbols; and
   a second symbol after the group of one or more symbols.

7. The method of claim 4, further comprising, in response to the indication indicating that the UE does not support the mixed numerology, using a scaling factor to divide time resource allocation between CSI-RS based mobility measurement and SSB based mobility measurement.

8. The method of claim 1, further comprising, in response to the indication indicating that the UE does not support the mixed numerology, configuring the CSI-RS measurement expectation to not expect the UE to perform CSI-RS measurement on:
   a group of one or more symbols where the UE is configured to measure the SSB;
   a first symbol before the group of one or more symbols; and
   a second symbol after the group of one or more symbols.

9. The method of claim 1, further comprising, in response to the indication indicating that the UE does not support the mixed numerology, configuring the SSB measurement expectation to not expect the UE to perform SSB measurement on:
   a group of one or more symbols where the UE is configured to measure the CSI-RS;
   a first symbol before the group of one or more symbols; and
   a second symbol after the group of one or more symbols.

10. The method of claim 1, wherein the indication indicates whether the UE supports concurrent intra-frequency measurement on the serving cell or the neighboring cell on the CSI-RS for mobility with a first SCS and PDCCH or PDSCH reception at the UE from the serving cell with a second SCS, the method further comprising configuring at least one of the CSI-RS and the PDCCH or PDSCH based on the indication.

11. The method of claim 10, further comprising, in response to the indication indicating that the UE does not support the mixed numerology, not scheduling the UE for the PDCCH or PDSCH reception on:
- a group of one or more symbols where the UE is configured to measure the CSI-RS;
- a first symbol before the group of one or more symbols; and
- a second symbol after the group of one or more symbols.

12. The method of claim 1, wherein the indication indicates whether the UE supports concurrent intra-frequency measurement on the serving cell or the neighboring cell on the SSB with a first SCS, on the CSI-RS for mobility with a second SCS, and PDCCH or PDSCH reception at the UE from the serving cell with a third SCS, the method further comprising configuring at least one of the CSI-RS and the PDCCH or PDSCH based on the indication.

13. The method of claim 12, further comprising:
- in a first frequency range (FR1), selecting the first SCS from a first group comprising 15 kHz and 30 kHz, and selecting the second SCS and the third SCS from a second group comprising 30 kHz and 60 kHz; and
- in a second frequency range (FR2), selecting the first SCS from a third group comprising 120 kHz and 240 kHz, and selecting the second SCS and the third SCS from a fourth group comprising 60 kHz and 120 kHz.

14. The method of claim 12, further comprising, in response to the indication indicating that the UE does not support the mixed numerology, not expect the UE to perform operations of receiving data, measuring the CSI-RS for mobility, and measuring the SSB when the operations collide on the time domain and use different SCS values for the first SCS, the second SCS, and the third SCS.

15. A non-transitory computer-readable storage medium, the computer-readable storage medium including instructions that when executed by a computer, cause the computer to:
- decode a message from a user equipment (UE), the message comprising an indication of whether the UE supports a mixed numerology wherein a different subcarrier spacing (SCS) is used in a serving cell or a neighboring cell for concurrent processing of at least two of:
  - intra-frequency measurement by the UE of a synchronization signal block (SSB);
  - intra-frequency measurement by the UE of a channel state information reference signal (CSI-RS) for mobility; and
  - reception by the UE of a physical downlink control channel (PDCCH) or a physical downlink shared channel (PDSCH);
- wherein the indication indicates whether the UE supports concurrent intra-frequency measurement on the serving cell or the neighboring cell for both the SSB with a first SCS and the CSI-RS for mobility with a second SCS;
- based on the indication, configure at least one of a CSI-RS measurement expectation, an SSB measurement expectation, and a scheduling restriction for reception of the PDCCH or the PDSCH by the UE;
- based on the indication, configure at least one of the CSI-RS and the PDCCH or PDSCH; and
- responsive to the indication indicate that the UE does not support the mixed numerology, using a scaling factor to divide time resource allocation between CSI-RS based mobility measurement and SSB based mobility measurement.

16. The non-transitory computer-readable storage medium of claim 15, further comprising:
- configuring up to two SCS for the serving cell, wherein the SSB and the CSI-RS for mobility share a first SCS of the two SCS for the serving cell, and
- wherein the indication indicates whether the UE supports concurrent:
- intra-frequency measurements by the UE of the SSB or the CSI-RS for mobility using the first SCS; and
- reception of the PDCCH or the PDSCH by the UE from the serving cell using a second SCS of the two SCS.

17. The non-transitory computer-readable storage medium of claim 16, further comprising, in response to the indication indicating that the UE does not support the mixed numerology, configuring the scheduling restriction to not schedule the UE for reception of the PDCCH or the PDSCH on:
- a group of one or more symbols where the UE is configured to measure the SSB or the CSI-RS;
- a first symbol before the group of one or more symbols; and
- a second symbol after the group of one or more symbols.

18. The non-transitory computer-readable storage medium of claim 15, further comprising:
- configuring up to two SCS for the serving cell, wherein the CSI-RS for mobility and reception of the PDCCH or the PDSCH by the UE share a first SCS of the two SCS for the serving cell, and
- wherein the indication indicates whether the UE supports concurrent:
- reception of the PDCCH or the PDSCH by the UE from the serving cell, or intra-frequency measurements by the UE of the CSI-RS for mobility, using the first SCS; and
- intra-frequency measurements by the UE of the SSB using a second SCS of the two SCS.

19. The non-transitory computer-readable storage medium of claim 18, further comprising, in response to the indication indicating that the UE does not support the mixed numerology, configuring the CSI-RS measurement expectation to not expect the UE to perform CSI-RS measurement on:
- a group of one or more symbols where the UE is configured to measure the SSB;
- a first symbol before the group of one or more symbols; and
- a second symbol after the group of one or more symbols.

20. The non-transitory computer-readable storage medium of claim 18, further comprising, in response to the indication indicating that the UE does not support the mixed numerology, configuring the SSB measurement expectation to not expect the UE to perform SSB measurement on:
- a group of one or more symbols where the UE is configured to measure the CSI-RS;
- a first symbol before the group of one or more symbols; and
- a second symbol after the group of one or more symbols.

* * * * *